United States Patent [19]

Cox

[11] 4,223,689
[45] Sep. 23, 1980

[54] PORTABLE COLLAPSIBLE VEHICLE ROOF MOUNTED SLEEPING COMPARTMENT

[76] Inventor: Charlie O. Cox, 3717 SW. Corbett, Portland, Oreg. 97201

[21] Appl. No.: 25,925

[22] Filed: Apr. 2, 1979

[51] Int. Cl.[2] .......................... B60P 3/34; A45F 1/00
[52] U.S. Cl. .................................. 135/1 A; 296/164
[58] Field of Search .................... 135/1 A, 3 A, 4 A; 296/164, 168, 176, 172

[56] References Cited

U.S. PATENT DOCUMENTS

| | | | |
|---|---|---|---|
| 2,291,900 | 8/1942 | Jimmes | 135/4 A |
| 2,533,683 | 12/1950 | Neuhaus | 135/1 A |
| 2,727,252 | 12/1955 | Wheeler | 135/1 A |
| 2,754,041 | 7/1956 | Chaudiere | 135/4 A |
| 2,793,646 | 5/1957 | Lefebvre | 135/1 A |
| 3,021,852 | 2/1962 | Hoffman | 135/1 A |
| 3,143,121 | 8/1964 | McKee | 135/1 A |
| 3,228,405 | 1/1966 | Bursey et al. | 135/1 A |
| 3,575,460 | 4/1971 | Kennedy | 135/4 A |
| 3,603,330 | 9/1971 | Halldorson | 135/4 A |
| 3,661,418 | 5/1972 | Stewart | 135/4 A |

FOREIGN PATENT DOCUMENTS

| | | | |
|---|---|---|---|
| 513613 | 6/1955 | Canada | 135/4 A |
| 821226 | 8/1937 | France | 135/1 A |
| 1024233 | 3/1966 | United Kingdom | 135/1 A |

*Primary Examiner*—J. Karl Bell
*Attorney, Agent, or Firm*—W. Britton Moore

[57] ABSTRACT

A portable collapsible vehicle roof mounted sleeping compartment including a plastic housing with front and side walls, open rear, and a hinged top mounted on spaced rails clamped to a rack removably attached to the vehicle roof. Slidably telescoping within the open rear of the housing is a drawer-like section having a rigid bottom and top wall expandably interconneced thereto by flexible windowed side walls, flexible rear curtain, and a hinged rear wall. Telescoping sections in said rails are longitudinally extendable with telescoping legs hinged to the ends thereof for ground engagement to support the drawer-like section relative to the vehicle roof when extended, with the latter supporting the hinged top in angular elevated position, and entry being gained through the lowered hinged rear wall.

8 Claims, 6 Drawing Figures

PORTABLE COLLAPSIBLE VEHICLE ROOF MOUNTED SLEEPING COMPARTMENT

BACKGROUND OF THE INVENTION

This invention relates to a portable collapsible vehicle roof mounted sleeping compartment.

While it is common to arrange various camping and sleeping compartments on vehicles, such as represented in U.S. Pat. Nos. to Gledhill 2,531,678, Fisk 2,718,015, McKee 3,143,121, and Stewart 3,661,418, none thereof suggest arranging a low profile main housing on spaced roof rails telescopically extendable and hinged to provide ground engaging supports for the housing and a drawer-like rear section therein and slidably extendable therefrom, with this section being elevatable for raising a hinged housing top to provide a roomy sleeping compartment.

SUMMARY OF THE INVENTION

The principal object of the present invention is to provide a portable extendable and collapsible vehicle roof mounted sleeping compartment.

Another object is the provision of a generally rectangular low profile main housing having a pivotal top for angular elevation, and a drawer-like rear section slidably sleeved within the main housing and extendable rearwardly therefrom, with the rear section having a hinged rear wall and collapsible side walls which, when raised, elevate the top of the main housing and form a rear entry sleeping compartment.

Still another object is to provide a pair of spaced rails on a roof mounted rack having telescoping sections longitudinally extendable therefrom and leg portions hinged to the ends thereof for ground engagement for supporting the main housing and telescoping rear section thereof in both housed and extendable sleeping positions.

A further object is the provision of a sleeping compartment wherein the main housing includes rigid front and side walls and open bottom and rear walls, with the flat top being hinged at its front edge and being elevatable therefrom, and wherein the drawer-like rear section slidable thereinto includes flat bottom and top walls, a hinged rear wall, and flexible side walls, with the latter having a lazy-tong type linkage associated therewith for elevating the top horizontally and in parallel relation with the bottom wall and to engage with and angularly elevate the top wall of the housing.

A still further object is to provide a molded plastic two part sleeping compartment which is readily adaptable for mounting on any automobile roof top and which is compact for travel, but easily set up to accommodate two persons.

These and other objects and advantages will be apparent as the specification is considered with the accompanying drawings, wherein FIG. 1 is a perspective view of the sleeping compartment in expanded rail and ground supported position on an automobile roof;

DETAILED DESCRIPTION

Figure 1:
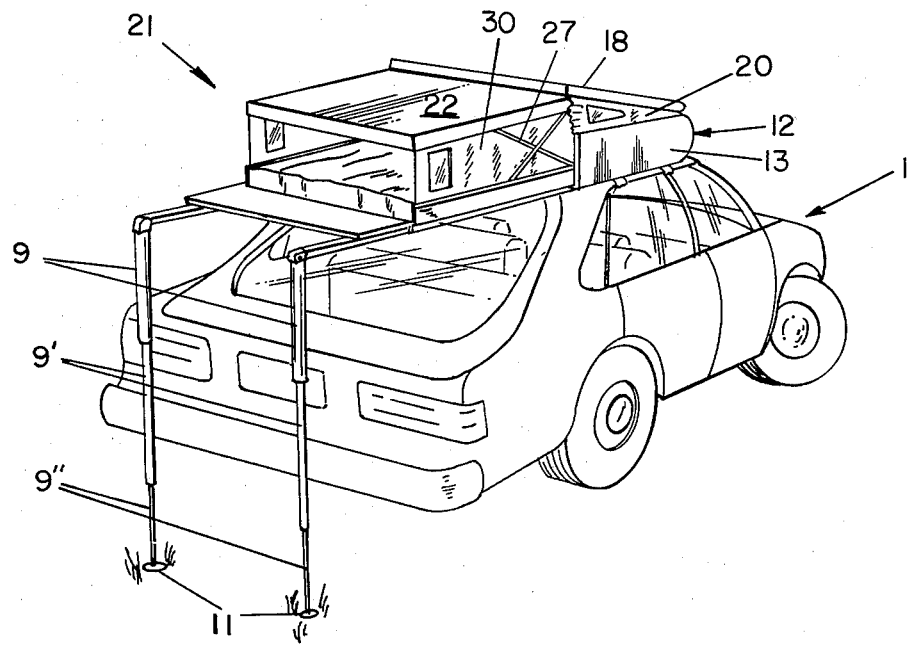

Referring more particularly to the drawings, wherein similar reference characters designate like parts throughout the several views, numeral 1 refers to an automobile of the sedan type having the usual rigid metal roof 2. A conventional rack 3 including spaced roof spanning flat ribs 4 is secured in the usual manner to the roof gutters by clamps 5.

Figure 4:
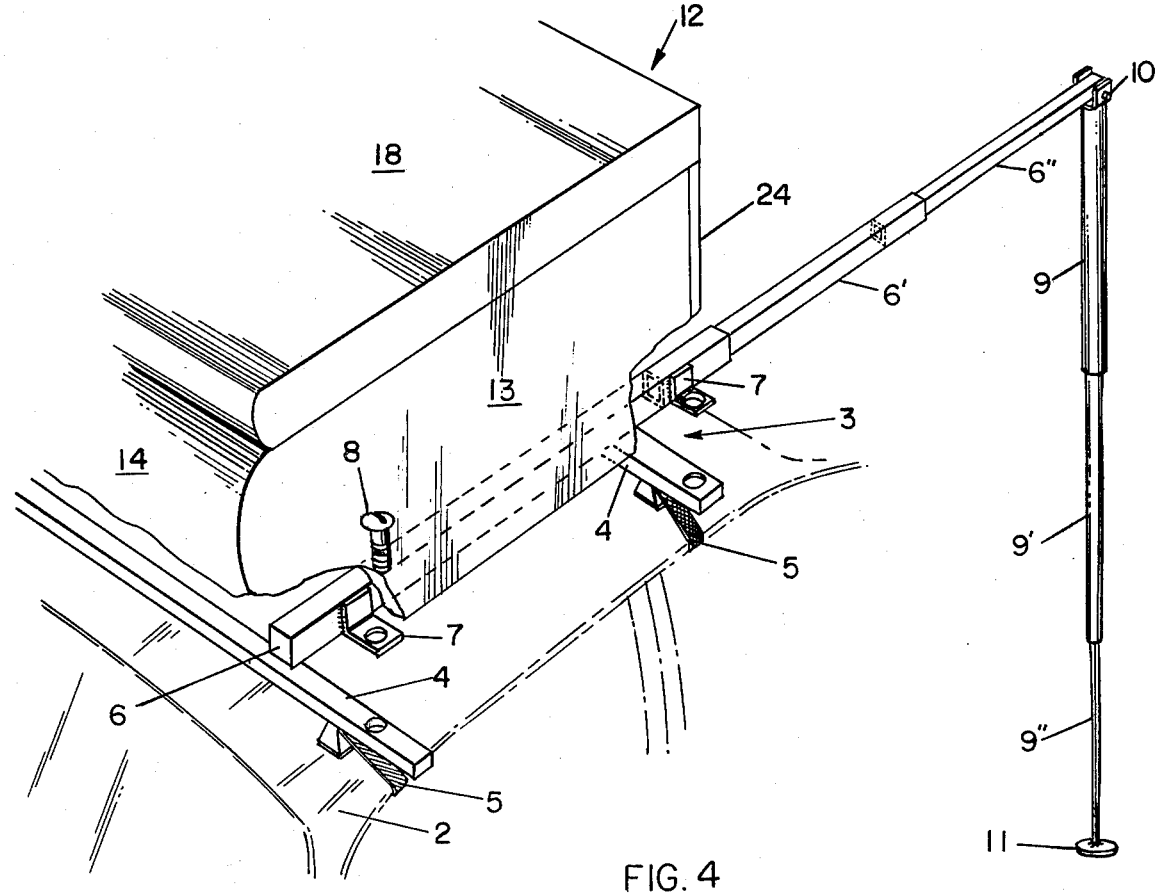
FIG. 4 is a view, similar to FIG. 3, but with one of the rails extended and in ground engaging position.

Supported on and extending longitudinally of each of the roof rack ribs 4 adjacent the opposing ends thereof are two generally rectangular elongated spaced rail sections 6 of metal or plastic, which are securely but removably attached to the ribs by spaced L-shaped apertured clips 7, suitably affixed to a side wall of each rail, and screws or the like 8. Sleeved and telescoped within each other and in rail sections 6 are intermediate and end rail sections 6' and 6", of similar but smaller cross section as section 6. Removably pivotally attached to the outer end of each rail section 6" by a pivot pin 10 is a leg member 9 which may be of the same rectangular cross section as the rail sections or may be cylindrical, as shown in FIG. 4. Each leg member 9 similarly includes intermediate and end sections 9' and 9" sleeved and telescoped within each other, and suitably formed with feet members 11 on the lower ends of sections 9". It will, of course, be understood that the rail sections are suitably interconnected so they will remain interconnected when fully extended, as presently to be described, and the leg members may be removed for suitable storage within the vehicle trunk, by removal of pivot pins 10.

Figure 5:
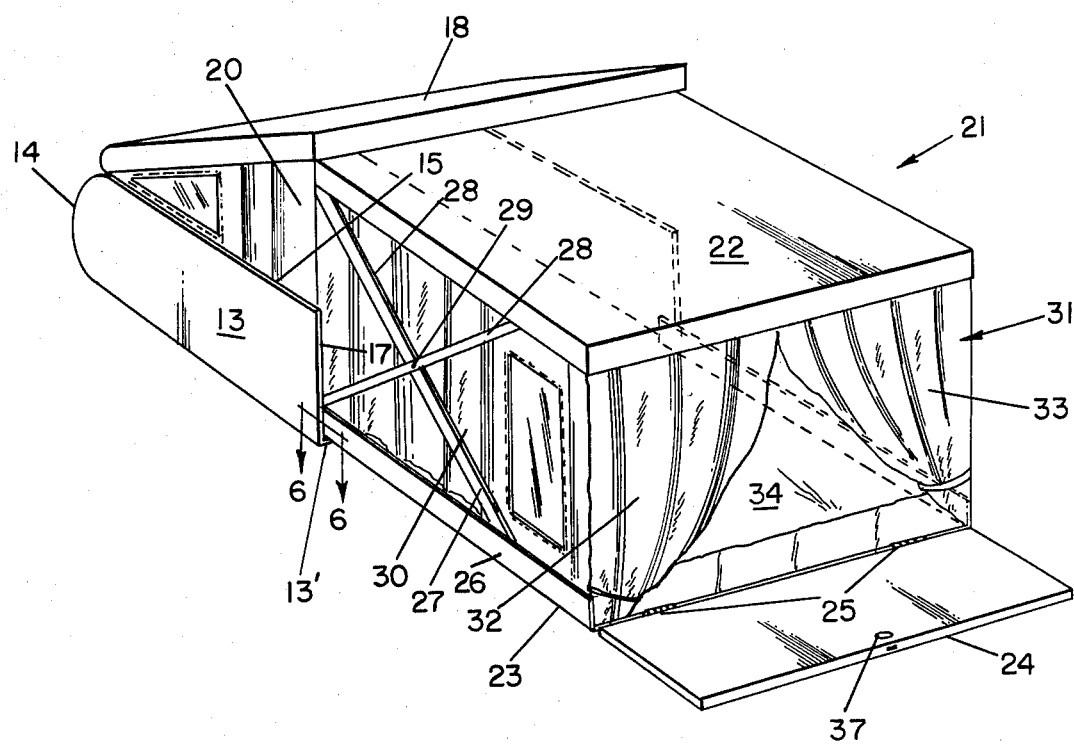
FIG. 5 is a perspective view of the sleeping compartment in expanded, elevated, and open position.

A main housing 12 of a two part sleeping compartment, preferably of some suitable strong but light plastic material, such as fiberglass, is generally rectangular in shape and includes relatively shallow flat side walls 13, a convex front wall 14, and is open at its top 15, bottom 16, and rear 17. A flat cover 18 of similar material is suitably hinged at its front edge by hinge or hinges 19 to the upper edge of front wall 14, and the side walls 13 may be suitably fixedly attached to the rail sections 6 by any suitable fastening means, not shown. Inasmuch as the cover is hinged and is angularly elevated, as shown in FIGS. 1 and 5, flexible windowed side curtains 20 of plastic or fabric may extend between the cover and the upper edges of side walls 13 and be suitably secured thereto. The bottom edges of side walls 13 are inturned, as at 13', to provide slides for receiving and supporting the second part of the compartment to be described.

Slidably sleeved on slides 13' and housed within main housing 12 is a drawer-like section 21 having rectangular flat top and bottom walls 22 and 23 and a rear wall 24. The latter is suitably hinged by hinge or hinges 25 to the rear edge of bottom wall 23, and the side edges of bottom wall 23 are upturned, as at 26, so as to flatly engage the inner faces of main housing side walls 13 while being moved to inactive housed and active extended sleeping positions relative thereto. The side edges of the top and bottom are collapsibly interconnected for parallel vertical movement of the top relative to the bottom by suitable and conventional lazy tong type devices 27 including intersecting arms 28 pivoted, as at 29, at their mid sections and, in turn, pivoted at their opposing ends to the top and bottom. Flexible windowed side curtains 30 of plastic or fabric is arranged at either side of section 21 and is attached to the side edges of the top and bottom walls 22 and 23 so as to stretch therebetween when the lazy tong arms are expanded and the top wall 22 elevated to the FIG. 5 position. A rear drape curtain 31 is also attached to the rear edge of top wall 22 so as to drape or hang therefrom in the elevated position of FIG. 5. Curtain 31 is divided into two panel sections 32—32 to permit the sections being suitably tied back for entry therethrough when rear wall 24 is lowered. A suitable mattress 34, which may be inflatable, is flatly disposed on bottom wall 23.

Figure 6:
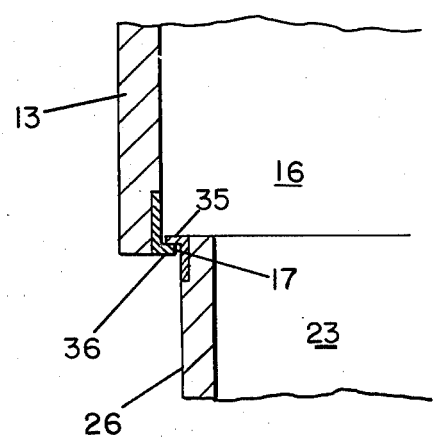
FIG. 6 is a section on the line 6—6 of FIG. 5.

When the intermediate and end rail sections 6' and 6" are slidably withdrawn from the spaced rails 6 and the leg members 9 are similarly extended and pivotally connected to the ends of rail sections 6" so as to provide ground engaging supports, as shown in FIGS. 1 and 4, the drawer-like section 21 may be slidably withdrawn and extended from main housing 12. In the latter extended position, the flat bottom wall 23 thereof rests on and is supported by the rail sections 6' and 6". Section 21 may then be elevated by lifting or pushing up the top wall 22 and expanding the lazy tong arms 28. As the top wall 22 underlies the rear edge of the main housing cover 18, during the vertical movement of the former, cover 18 will be angularly elevated, as shown in FIGS. 1 and 5, and the side curtains 20 unfolded and stretched. While the lazy tong arms 28 are tightly pivotally interconnected so that they will tend to remain fixed in expanded positions, when the top is raised, suitable latching hooks or the like, not shown, may be provided for connection to and locking the arms in such positions. Section 21 is retained interconnected to main housing 12 to prevent complete withdrawal therefrom by outwardly bent stops or clips 35, suitably attached to the outer faces of upturned side edges 26 of bottom wall 23, which fit behind and engage with inwardly bent clips 36 attached to the rear edges of inner housing walls 13, as shown in FIG. 6. In the extended position of section 21, with the hinged rear wall 24 swung downwardly into engagement with and support by end rail sections 6", it will be apparent that two persons may enter through the rear opening and fully and comfortably recline within the main housing and drawer-like section.

Figure 2:
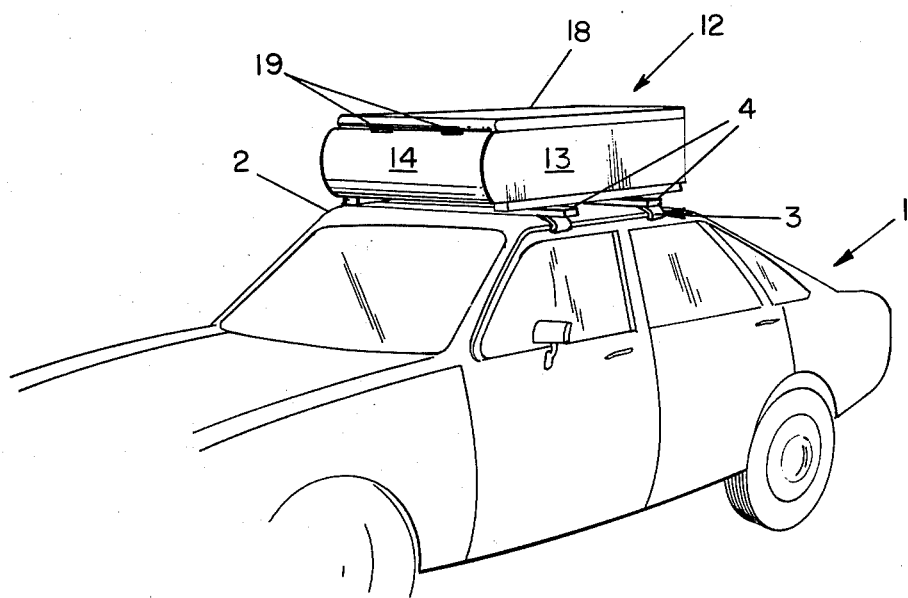
FIG. 2 is a perspective view of the compartment in closed travelling position.
Figure 3:
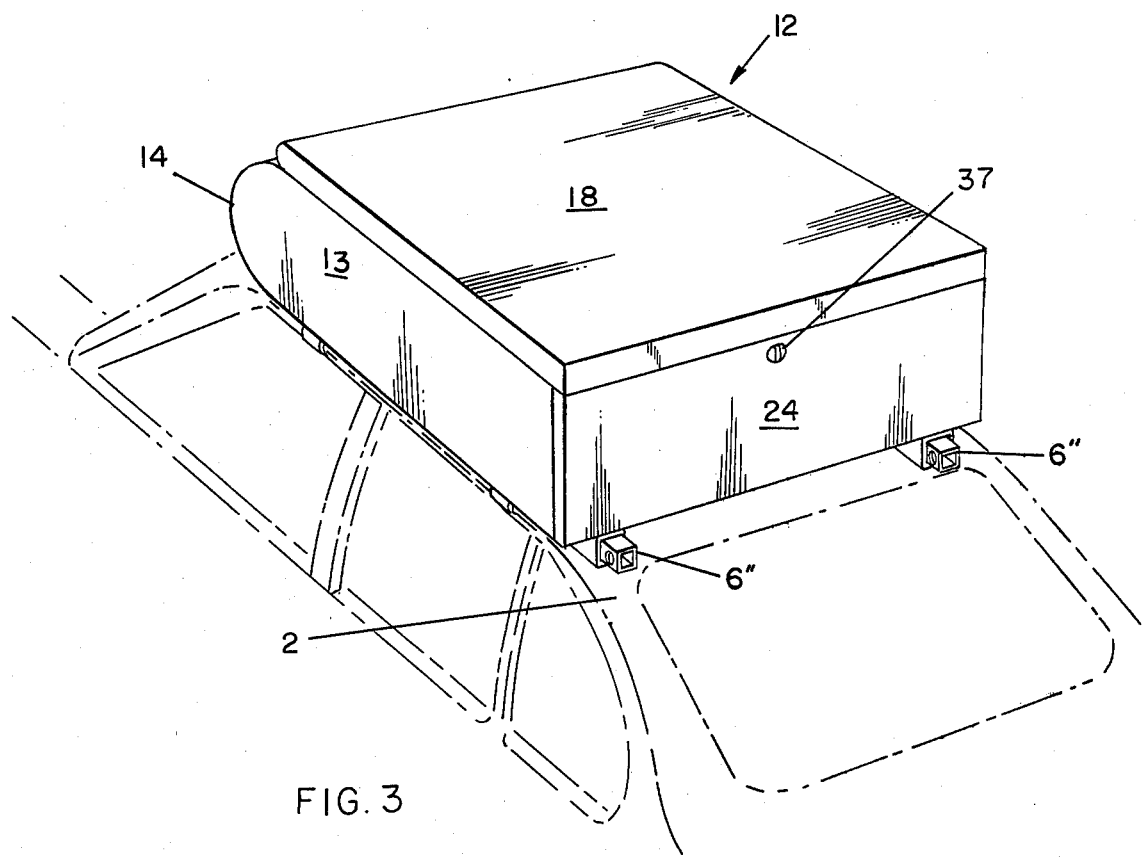
FIG. 3 is a perspective view of the compartment showing the hinged rear wall in closed locked position.

When it is desired to return the drawer-like section 21 to main housing 21, the lazy tong arms may be unlatched and downward pressure applied to top wall 22 to collapse the same to a planer position below the upper ends of side housing walls 13. This movement lowers cover 18 into engagement with the walls 13, so that the hinged rear wall 24 may be swung upwardly to close the rear open end of section 21, and permit the section to be slid forwardly on slides 13' into main housing 12 in the housed positions of FIGS. 2-4. A suitable lock 37 may be provided on hinged wall 24 to latchingly coact with the rear portion of main housing cover 18 to lock the same when collapsed and housed. In the latter position, it will, of course, be understood that the legs may be disconnected from end rail sections 6" and the latter collapsed for separate storage. The rail sections 6' and 6" are then telescoped forwardly so as to be housed within the main rail sections 6, as shown in FIG. 3.

While a preferred embodiment of vehicle roof mounted sleeping compartment has been shown and described, it is to be understood that various changes and improvements may be made therein, without departing from the scope and spirit of the appended claims.

What I claim is:

1. A portable collapsible sleeping compartment for mounting on the roof of a passenger type vehicle having rack means thereon, parallely spaced longitudinally telescopically extensible rail members removably attached to said rack means, telescopically extensible leg members removably pivoted to said rail members and downwardly dependable therefrom for supporting ground engagement, a main housing compartment comprising rigid front and side walls, open bottom and rear ends, and a flat cover hinged to said front wall, said compartment being mounted on and supported by said rails, a drawer-like section slidably extensible into and from said main compartment and including parallel spaced flat top and bottom walls movably interconnected at their sides by lazy tong type means having intersectingly pivoted arms pivoted at their opposing ends to said top and bottom walls, rear wall means pivoted to the rear of said bottom wall, flexible side curtains extending between said hinged cover and the side walls of said main housing and between the side edges of said top and bottom walls, and a rear curtain at the rear of said drawer-like section, whereby when said latter section is extended from said main housing and the top walls expanded vertically said hinged cover will be angularly elevated to provide a covered and protected sleeping compartment, with said drawer-like section thereof being supported by said rail members.

2. In a portable collapsible sleeping compartment according to claim 1, wherein said rack means transversely spans said roof, and a pair of rail members extend longitudinally of said roof at right angles to said rack means.

3. In a portable collapsible sleeping compartment according to claim 2, wherein said rail members are generally rectangular in cross section and each includes at least two sections telescopically sleevable within each other, and said leg members include at least two sections telescopically sleevable within each other.

4. In a portable collapsible sleeping compartment according to claim 1, wherein said lazy tong type means each includes a pair of elongated arms intersecting and pivoted intermediate their ends, whereby said flat top wall is vertically collapsible parallel and relative to said flat bottom wall.

5. In a portable collapsible sleeping compartment according to claim 4, wherein the flat top wall of said drawer-like section underlies and is engageable with said hinged cover for angularly elevating the cover when said top wall is elevated.

6. In a portable collapsible sleeping compartment according to claim 1, wherein the lower ends of said side main housing walls are inturned to provide slides for slidably receiving the bottom wall of said drawer-like section.

7. In a portable collapsible sleeping compartment according to claim 6, wherein stop means on the side walls of said main housing and said section retain the same interconnected.

8. In a portable collapsible sleeping compartment according to claim 1, wherein said main compartment and said drawer-like section are generally rectangular and generally shallow, and the front wall of said main compartment is convex.

* * * * *